United States Patent
Lin

(10) Patent No.: US 6,725,015 B1
(45) Date of Patent: Apr. 20, 2004

(54) WIRELESS NETWORK ACCESS FACILITY

(75) Inventor: Robert Lin, Hsin Chuang (TW)

(73) Assignee: Global Sun Technology Inc., Taipei (TW)

( * ) Notice: Subject to any disclaimer, the term of this patent is extended or adjusted under 35 U.S.C. 154(b) by 0 days.

(21) Appl. No.: 10/287,620

(22) Filed: Nov. 1, 2002

(51) Int. Cl.[7] .............................. H04Q 7/24
(52) U.S. Cl. ........................ 455/41.2; 370/338
(58) Field of Search ................. 455/41.2, 555, 455/554.2, 554.1, 561; 370/338, 449, 450

(56) References Cited

U.S. PATENT DOCUMENTS 6,031,863 A * 2/2000 Jusa et al. ............... 375/132
6,477,156 B1 * 11/2002 Ala-Laurila et al. ....... 370/331
6,571,103 B1 * 5/2003 Novakov .................. 455/464

* cited by examiner

*Primary Examiner*—Nay Maung
*Assistant Examiner*—Nick Corsaro

(57) ABSTRACT

A wireless network access facility includes one or more IEEE frequency devices, one or more multi-function actuating devices, and a processor device which includes a control device coupled to the IEEE frequency devices for determining a single or a multi-frequency mode, and a transmitting device coupled to the control device for checking identifications of users. An organizing device may be used for selectively operating various modes. A frequency control device may be used for converting frequencies and for transmitting with different frequencies.

3 Claims, 7 Drawing Sheets

FIG. 4

WIRELESS NETWORK ACCESS FACILITY

BACKGROUND OF THE INVENTION

1. Field of the Invention

The present invention relates to a wireless network access facility, and more particularly to a wireless network access facility for conveniently communicating with the wireless network system.

2. Description of the Prior Art

Typical wireless network systems comprise one or more access devices for communication purposes. The users may be communicated with the access device with personal computers or notebook computers that have wireless network cards plugged therein.

Some of the typical access devices may be used for communicating with or receiving either of the frequency signals: institute of electrical and electronic engineers (IEEE) 802.11a or IEEE802.11b. For receiving both of the frequency signals, the users have to purchase and couple two or more access devices together for receiving the frequency signals respectively.

The other typical access devices may be developed and used for communicating with or receiving both of the frequency signals IEEE802.11a and IEEE802.11b. However, for allowing the access devices to receive both of the frequency signals, the access devices have to check the signals belong to IEEE802.11a or IEEE802.11b, before the signals may be received or communicated with each other.

In addition, the access devices also have to check the service set identifiers (SSID) of the users, and/or to check the wired equivalency protocol (WEP) before the signals may be received. The access devices may also required to determine or to select either of the orthogonal frequency division multiplexer (OFDM), or packet binary convolutional code (PBCC), or complementary code keying (CCK) for communication purposes.

When the access devices receive or communicate with the signals from one of the users, the other users have to wait until the previous user has completing the communication. The data rate may thus be greatly decreased or lost, and may thus greatly decrease the working efficiency.

For the normal or huge buildings, each of the buildings may have to prepare or to purchase or to install an access device each, and the access devices have to be coupled together or communicated with a local area network (LAN) with one or more bridges, such that the users in different buildings may not be easily communicated with each other.

In order to increase the work flow or data rate or the quantity of services, a number of access devices are required to be purchased and coupled in series to the LAN. The other access devices are further required to be provided and coupled to the LAN for receiving the other signals of different frequencies.

The present invention has arisen to mitigate and/or obviate the afore-described disadvantages of the conventional wireless network access facilities.

SUMMARY OF THE INVENTION

The primary objective of the present invention is to provide a wireless network access facility for conveniently communicating with the wireless network system.

The other objective of the present invention is to provide a wireless network access facility for receiving various or different frequencies.

The further objective of the present invention is to provide a wireless network access facility for conveniently communicating with various operation modes.

In accordance with one aspect of the invention, there is provided a wireless network access facility comprising at least one IEEE frequency device, at least one multi-function actuating device, and a processor device including a control device coupled to the IEEE frequency device, for determining either a single frequency mode or a multi-frequency mode, a transmitting device coupled to the control device for transmitting purposes and for checking identifications of users, an organizing device coupled to the control device and the transmitting device for selectively operating various modes, and a frequency control device coupled between the transmitting device and the IEEE frequency device, for converting frequencies and for actuating the IEEE frequency devices to communicate with selected or different frequencies, and thus for increasing the flow or data or working rate, and for preventing the users from waiting to enter or access into the network system.

The multi-function actuating device is selectively operatable with either a client mode, a backup mode, a group mode, a bridge mode, or a repeat mode, or the combination of the modes.

The processor device further includes a flow balance device and a flow control device coupled between the transmitting device and the IEEE frequency device, for balancing signal transmission and for controlling flow of frequencies respectively.

The IEEE frequency device is selectively operatable with either an IEEE802.11a, an IEEE802.11b, an IEEE802.11a+b, or an IEEE802.11g, or the combination of the frequencies, for allowing the signals of different frequencies to be quickly transmitted or communicated with each other.

Further objectives and advantages of the present invention will become apparent from a careful reading of a detailed description provided hereinbelow, with appropriate reference to accompanying drawings.

BRIEF DESCRIPTION OF THE DRAWINGS

FIG. 4 is a schematic view illustrating the various arrangements of the wireless network access facility.

DETAILED DESCRIPTION OF THE PREFERRED EMBODIMENT

Figure 1:
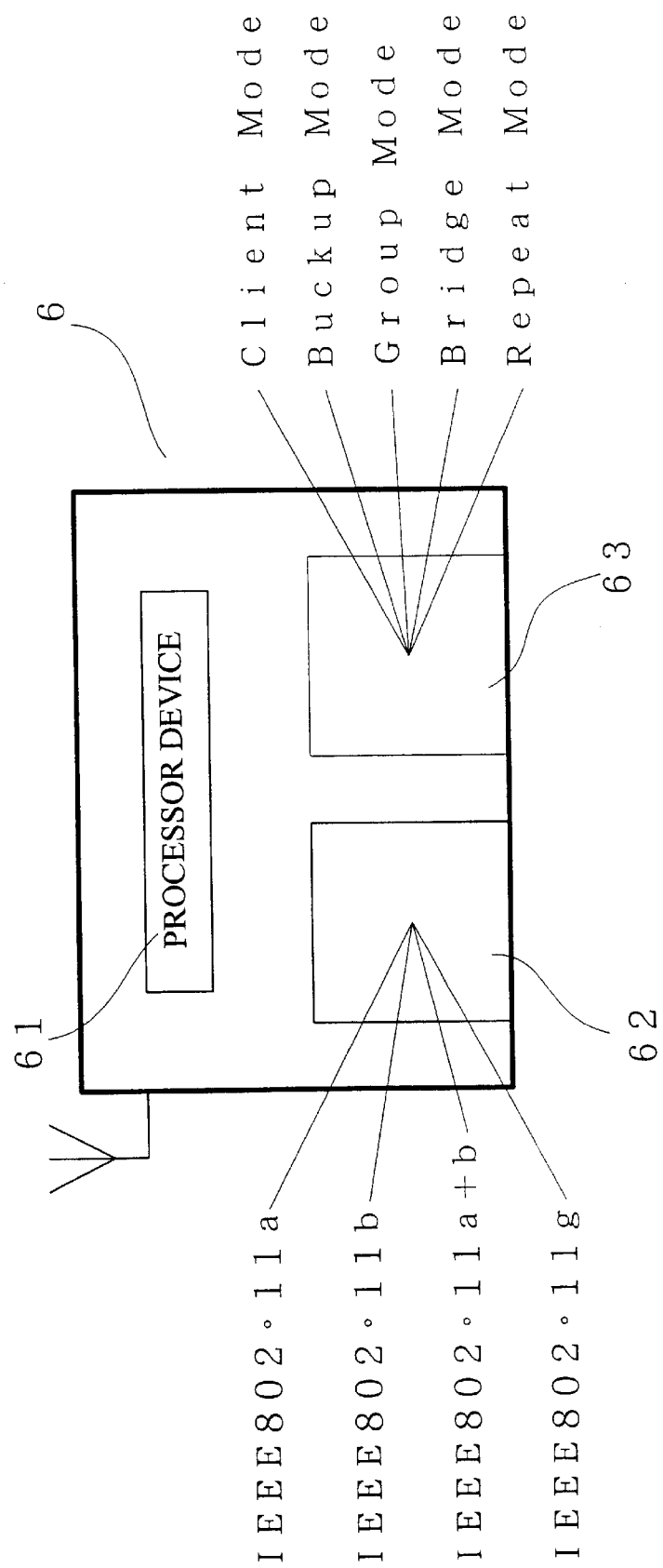
FIG. 1 is a block schematic view of a wireless network access facility in accordance with the present invention.

Referring to the drawings, and initially to FIG. 1, a wireless network access facility 6 in accordance with the present invention comprises a processor device 61 for processing purposes, one or more IEEE frequency devices 62, and one or more multi-function actuating devices 63 disposed therein.

Figure 4:
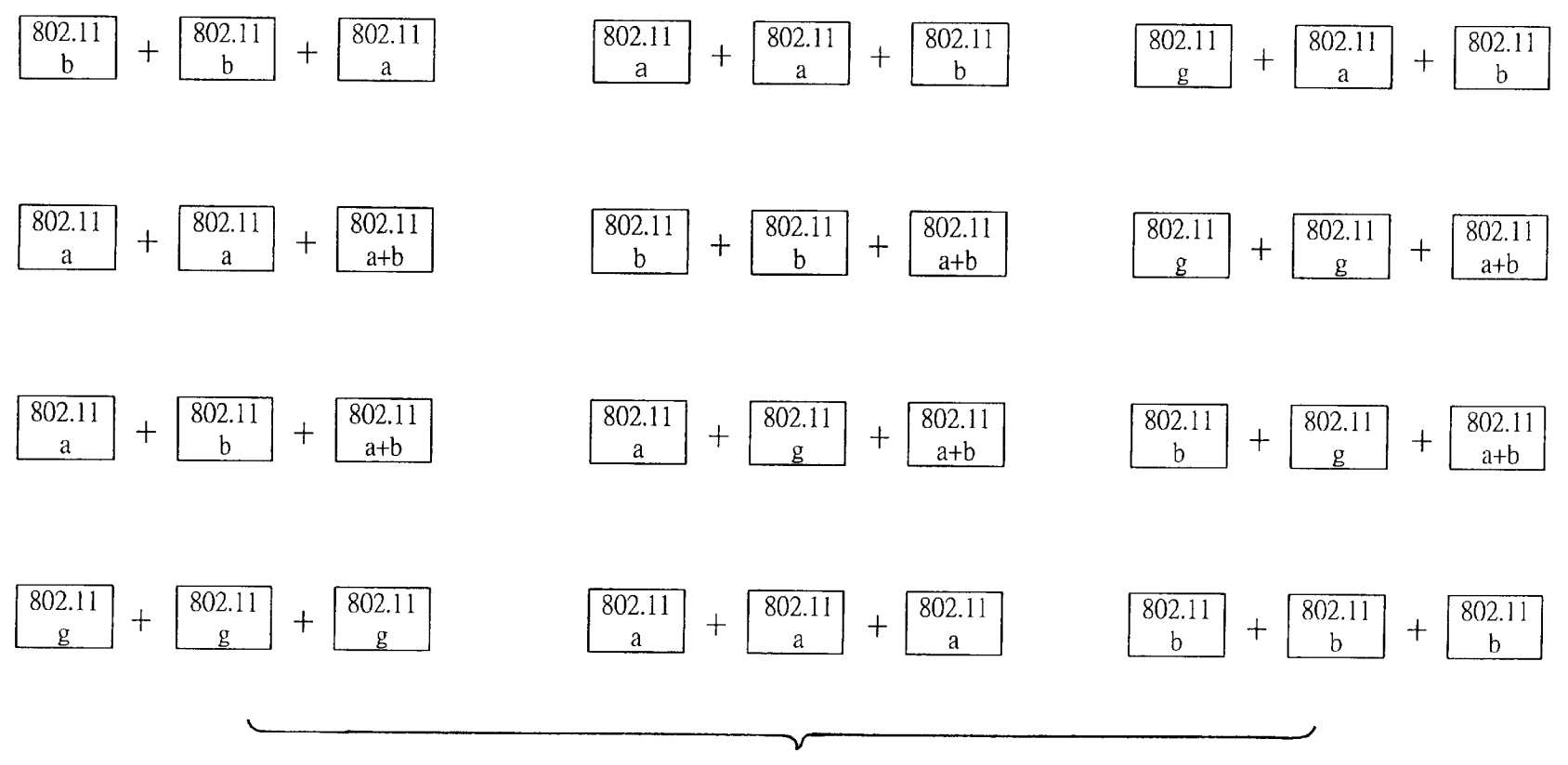

For example, the IEEE frequency devices 62 may include or communicate or operate with either or all of the following various frequencies: IEEE802.11a, IEEE802.11b, IEEE802.11a+b, or IEEE802.11g, or the combination thereof, as shown in FIG. 4.

The multi-function actuating devices 63 may include or selectively communicate or operate with either or all of the following modes: client mode, backup mode, group mode, bridge mode, repeat mode, or the combination thereof.

It is to be noted that the IEEE frequency devices 62 and the multi-function actuating devices 63 may be made or arranged or built in the wireless network access facility 6, or may be made as cards for easily and readily plugged or coupled to various computer facilities or access devices.

Figure 2:
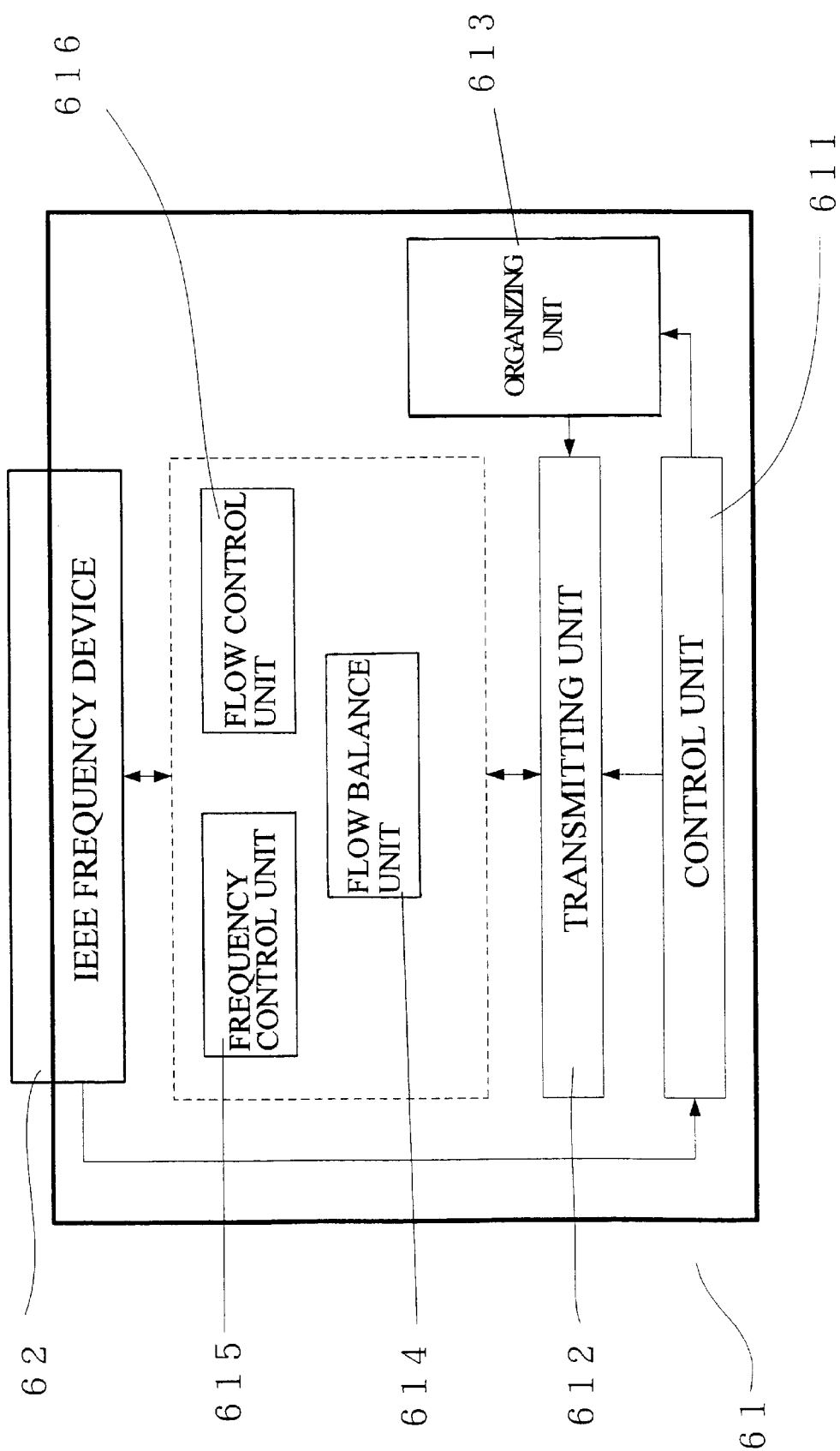
FIG. 2 is another block schematic view of the wireless network access facility.

Referring next to FIG. 2, the processor device 61 includes a control unit 611 coupled to a transmitting unit 612 and an organizing unit 613. A flow balance unit 614 and a frequency control unit 615 and a flow control unit 616 are coupled between the transmitting unit 612 and the IEEE frequency devices 62.

The control unit 611 may also be coupled to the IEEE frequency devices 62, and may be used for detecting or determining either a single frequency or single function mode or a multi-frequency or multi-function mode.

The transmitting unit 612 is coupled to the control unit 611 for supporting or aiding the control unit 611, and for communicating purposes. The transmitting unit 612 may further be provided for checking or identifying the service set identifiers (SSID) or the identifications of the users.

The organizing unit 613 may be used for supporting or aiding the multi-frequency or multi-function mode of the multi-function actuating device 63, or for selectively actuating or operating either or all of the client mode, the backup mode, the group mode, the bridge mode, the repeat mode, or the combination thereof.

The flow balance unit 614 may be used for such as balancing the signals transmission, and the frequency control unit 615 may be used for such as converting or changing the frequencies, and the flow control unit 616 may be used for such as controlling the flow of frequencies.

Figure 3:
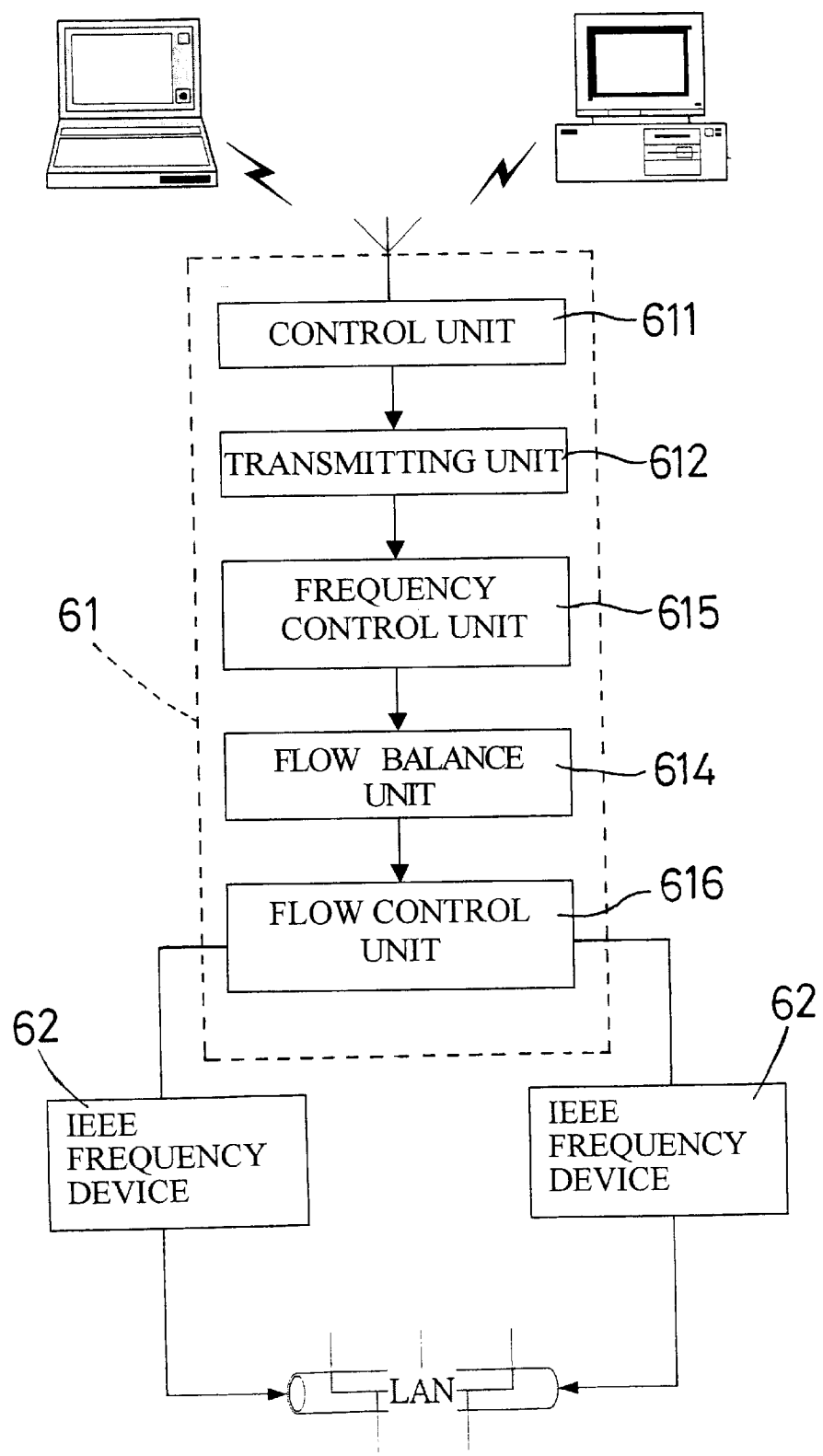
FIG. 3 is a further block schematic view of the wireless network access facility.

Referring next to FIG. 3, in operation, for example, the control unit 611 may be used for receiving the signals from various personal computers and/or notebook computers, and for determining either the single frequency or single function mode or the multi-frequency or multi-function mode.

In addition to the communicating purposes or functions, the transmitting unit 612 may further be provided or used for checking or identifying the frequencies (IEEE802.11) of the users, and for further checking or identifying the service set identifiers (SSID) and/or the wired equivalency protocol (WEP) of the users.

The frequency control unit 615 may then be used for such as converting or changing the frequencies, such as for changing or selecting the orthogonal frequency division multiplexer (OFDM), or packet binary convolutional code (PBCC), or complementary code keying (CCK) for communication with different frequencies.

The different frequencies may be coupled to different IEEE frequency devices 62 which may be communicated or transmitted with different frequencies, in order to increase the transmitting flow rate and to reduce the loss of the data rate of the facility.

The flow balance unit 614 may be used for balancing the signals transmission, and the flow control unit 616 may be used for controlling the flow of various frequencies, in order to stabilize the transmission of the signals and to increase the flow or data rate of the transmission.

For example, the flow control unit 616 may be used for controlling the flow of various frequencies, and for controlling or selecting either of the frequency combinations as shown in FIG. 4. For example, when the frequency combination 802.11a+802.11b+802.11a+b is used and when the frequency 802.11b has been used more frequently, the flow control unit 616 may control both the frequencies 802.11b and 802.11a+b to transmit the signals of the frequency 802.11b.

Figure 5:
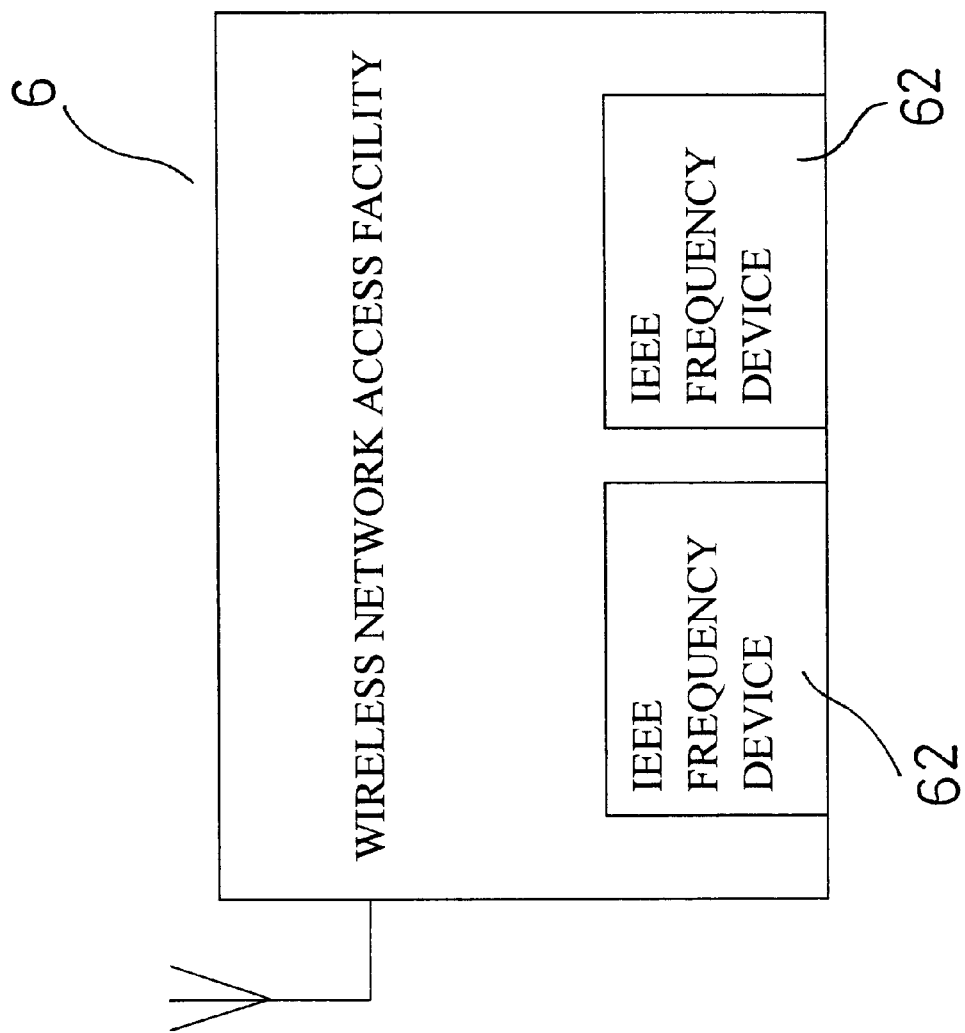
FIGS. 5, 6, 7 are three still further block schematic views illustrating the other arrangements of the wireless network access facility.
Figure 6:
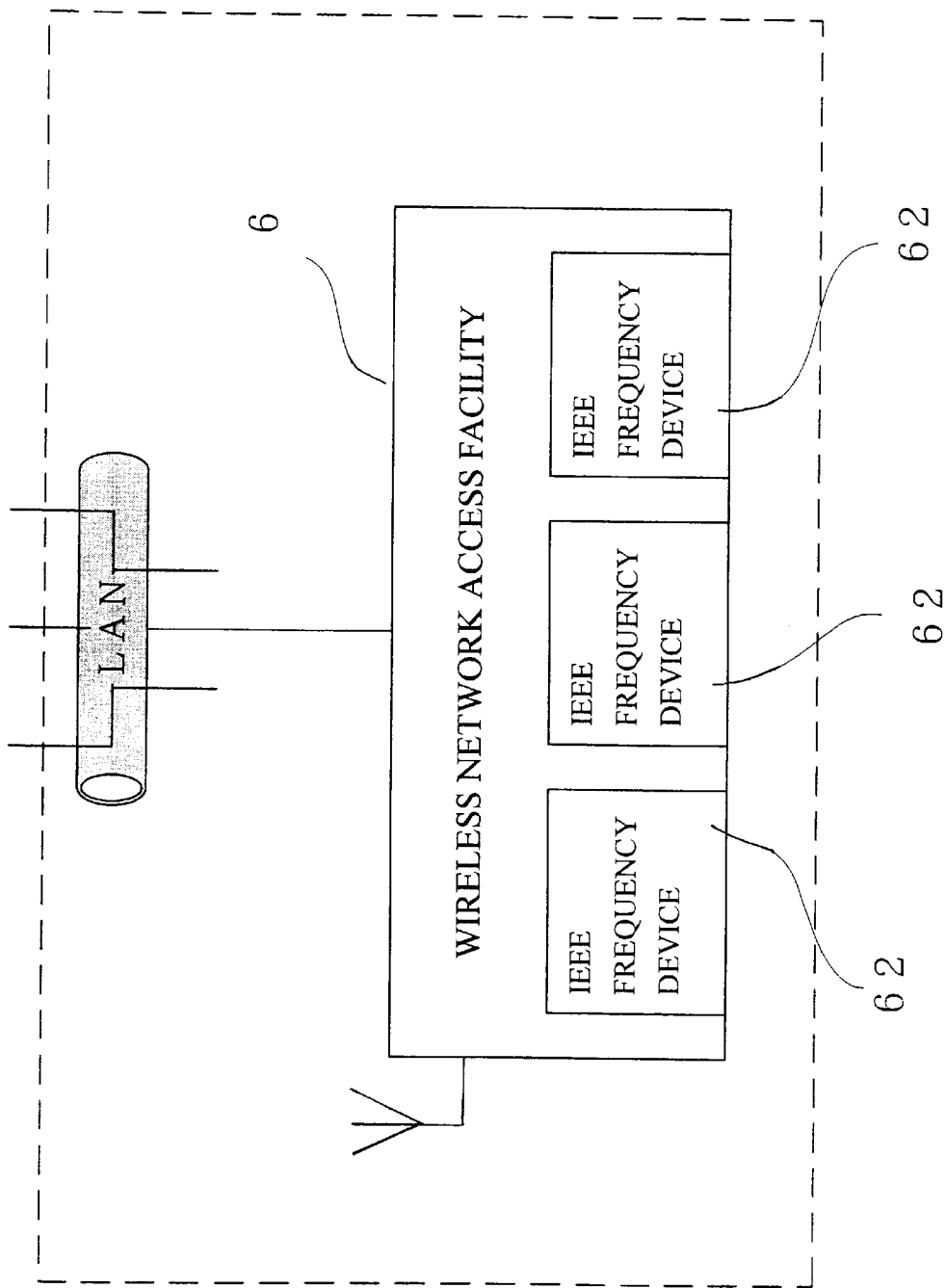

Referring next to FIGS. 5, 6, the wireless network access facility 6 may include one or more IEEE frequency devices 62, and/or one or more multi-function actuating devices 63 disposed therein, for different uses.

Figure 7:
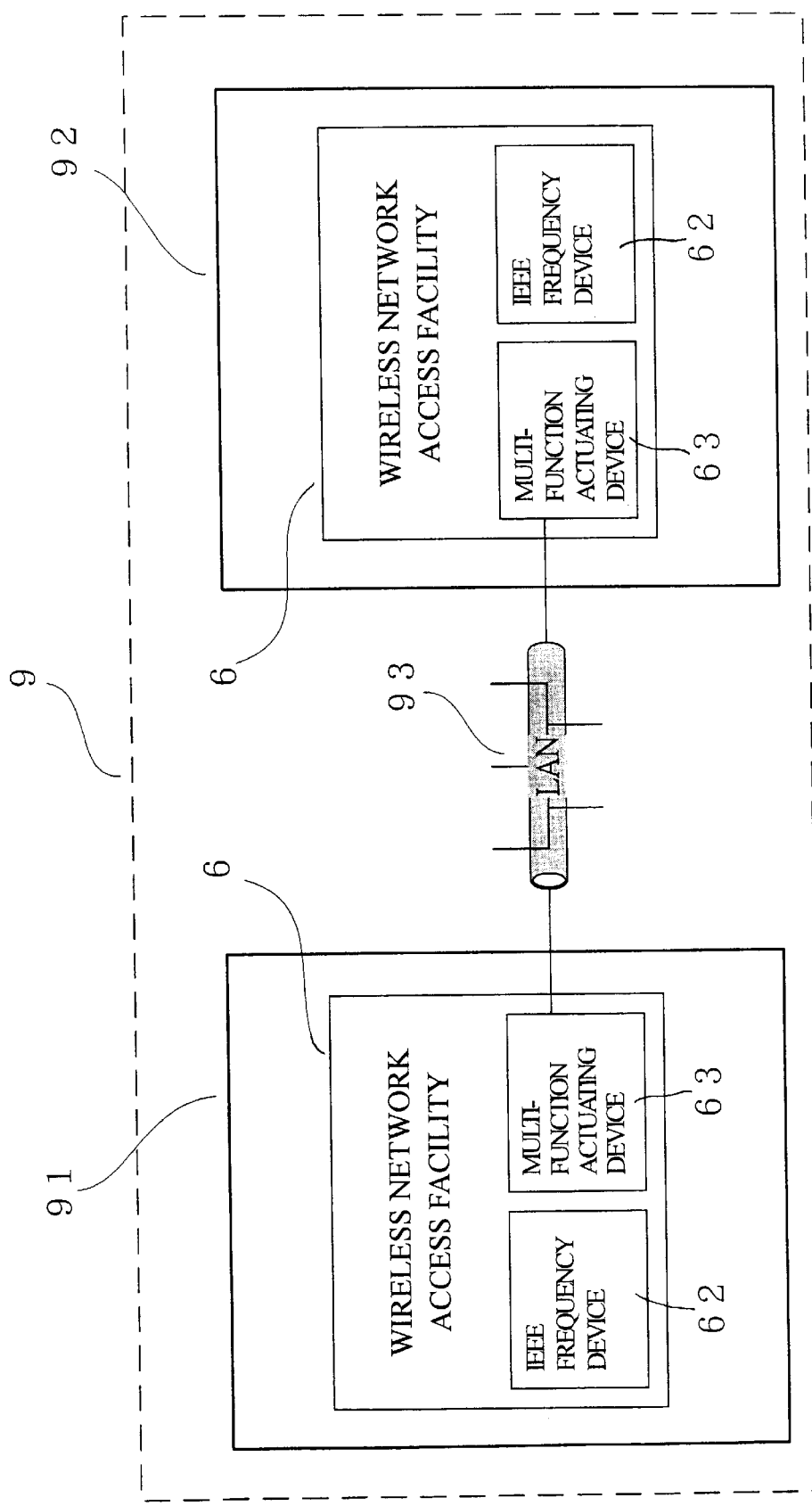

Referring next to FIG. 7, in operation, two or more buildings 91, 92 may each include a wireless network access facility 6 disposed therein, and having either the IEEE frequency devices 62 or the multi-function actuating devices 63 coupled together to a local area network (LAN) 93, for forming a wireless network area 9, and for allowing a number of buildings 91, 92 to be communicated with each other with a simplified assembly having fewer wireless network access facilities 6.

Accordingly, the wireless network access facility may be-used for conveniently communicating with the wireless network system, and/or for receiving various or different frequencies, conveniently communicating with the various operating modes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wireless network access facility comprising:
   a) at least one IEEE frequency device,
   b) at least one multi-function actuating device, and
   c) a processor device including:
      i) a control unit coupled to said at least one IEEE frequency device, for determining either a single frequency mode or a multi-frequency mode,
      ii) a transmitting unit coupled to said control unit for transmitting purposes and for checking identifications of users,
      iii) an organizing unit coupled to said control unit and said transmitting unit for selectively operating various modes, and
      iv) a frequency control unit coupled between said transmitting unit for selectively operating various modes, and said at least one IEEE frequency device, for converting frequencies and for actuating said at least one IEEE frequency device to communicate with selected frequencies,
   said at least one multi-function actuating device being selectively operable with either a client mode, a backup mode, a group mode, a bridge mode, or a repeat mode.

2. A wireless network access facility comprising:
   a) at least one IEEE frequency device,
   b) at least one multi-function actuating device, and
   c) a processor device including:
      i) a control unit coupled to said at least one IEEE frequency device, for determining either a single frequency mode or a multi-frequency mode,
      ii) a transmitting unit coupled to said control unit for transmitting purposes and for checking identifications of users,
      iii) an organizing unit coupled to said control unit and said transmitting unit for selectively operating various modes, and iv) a frequency control unit coupled between said transmitting unit for selectively operating various modes, and said at least one IEEE frequency device, for converting frequencies and for actuating said at least one IEEE frequency device to communicate with selected frequencies, said processor device further including a flow balance unit and a flow control unit coupled between said transmitting unit and said at least one IEEE frequency device, for balancing signal transmission and for controlling flow of frequencies respectively.

3. A wireless network access facility comprising:
a) at least one IEEE frequency device,
b) at least one multi-function actuating device, and
c) a processor device including:
i) a control unit coupled to said at least one IEEE frequency device, for determining either a single frequency mode or a multi-frequency mode,
ii) a transmitting unit coupled to said control unit for transmitting purposes and for checking identifications of users,
iii) an organizing unit coupled to said control unit and said transmitting unit for selectively operating various modes, and
iv) a frequency control unit coupled between said transmitting unit for selectively operating various modes, and said at least one IEEE frequency device, for converting frequencies and for actuating said at least one IEEE frequency device to communicate with selected frequencies, said at least one multi-function actuating device being selectively operatable with either an IEEE802.11a, an IEEE802.11b, an IEEE802.11a+b, or an IEEE802.11g.

* * * * *